US011282059B1

(12) United States Patent
Raak et al.

(10) Patent No.: US 11,282,059 B1
(45) Date of Patent: Mar. 22, 2022

(54) FOOD ITEM SYSTEM INCLUDING VIRTUAL CART AND RELATED METHODS

(71) Applicant: Inmar Clearing, Inc., Winston-Salem, NC (US)

(72) Inventors: Alise Raak, Winston-Salem, NC (US); Stephanie Hagan, Winston-Salem, NC (US); Lori D. Jones, Winston-Salem, NC (US); Karen Mattingly, High Point, NC (US); Amber Shew, Winston-Salem, NC (US); Cheryl Vogler, Lewisville, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 227 days.

(21) Appl. No.: 16/592,244

(22) Filed: Oct. 3, 2019

(51) Int. Cl.
  *G06Q 20/20* (2012.01)
  *G06Q 30/06* (2012.01)
  *B62B 3/14* (2006.01)
  *G01G 19/414* (2006.01)

(52) U.S. Cl.
  CPC ......... *G06Q 20/208* (2013.01); *B62B 3/1408* (2013.01); *G01G 19/4144* (2013.01); *G06Q 30/0633* (2013.01); *G06Q 30/0641* (2013.01)

(58) Field of Classification Search
  CPC .................................................. G06Q 20/203
  USPC ......................................................... 705/23
  See application file for complete search history.

(56) References Cited

U.S. PATENT DOCUMENTS

| | | | |
|---|---|---|---|
| 6,145,629 A | 11/2000 | Addy | |
| 8,789,757 B2* | 7/2014 | Barten | G01G 21/30 |
| | | | 235/462.11 |
| 9,442,100 B2* | 9/2016 | Connor | G16H 20/60 |
| 10,121,133 B2 | 11/2018 | Nelms et al. | |
| 10,672,051 B2* | 6/2020 | Herring | G01B 11/00 |
| 10,803,435 B2* | 10/2020 | Nelms | G06Q 30/0641 |
| 10,810,568 B1* | 10/2020 | Wood | G07G 3/00 |
| 10,977,717 B2* | 4/2021 | Shmueli | G06F 3/017 |
| 11,030,675 B2* | 6/2021 | Kulkarni Wadhonkar | |
| | | | G06K 17/00 |
| 2009/0299822 A1 | 12/2009 | Harari et al. | |
| 2013/0191193 A1 | 7/2013 | Calman et al. | |
| 2018/0240180 A1* | 8/2018 | Glaser | G06K 9/00771 |
| 2020/0387881 A1* | 12/2020 | Smith | G06Q 10/0836 |
| 2020/0402030 A1* | 12/2020 | Jacobs | G07F 9/001 |
| 2021/0125269 A1* | 4/2021 | Magee | G06Q 30/0643 |

\* cited by examiner

*Primary Examiner* — Andrew Joseph Rudy
(74) *Attorney, Agent, or Firm* — Allen, Dyer, Doppelt + Gilchrist, P.A.

(57) ABSTRACT

A food item system may include a remote device associated with a given shopper and a weight sensor associated with a food product display that includes food items. The food item system may also include a food item processing server configured to add at least one user selected food item from among the food items to a virtual shopping cart associated with the given shopper based upon proximity of the remote device to the food product display and a change in weight from the weight sensor indicative that the at least one user selected food item has been removed from the food product display. The food item processing server may also be configured to communicate the virtual shopping cart of the given shopper for checkout.

23 Claims, 5 Drawing Sheets ium for processing a food item. The non-transitory computer readable medium includes computer executable instructions that when executed by a processor cause the processor to perform operations. The operations may include adding at least one

FOOD ITEM SYSTEM INCLUDING VIRTUAL CART AND RELATED METHODS

TECHNICAL FIELD

The present invention relates to the field of food item selection, and more particularly, to virtual shopping cart based checkout and related methods.

BACKGROUND

Shopping for food items may include the use of a shopping cart. A physical shopping cart permits the shopper to add merchandise or food items inside the cart for the shopper to transport the food items within a store. The shopper may transport the physical shopping cart between desirable food item locations within the store and physically remove a desired food item from a shelf for placement within the physical shopping cart. A shopper may checkout of the store by transporting the physical shopping cart including its contents to a checkout area where the food items or merchandise are scanned or processed for checkout.

Online shopping is a form of electronic commerce. Shoppers may find and select items for purchase from an online store or vendor. Similar to a shopping experience in a physical store, an online shopper may also add desired items to a virtual shopping cart. Items in the virtual shopping cart are processed for purchase during a checkout process.

Sales of a particular product or service may be based upon how well that product or service is marketed to a consumer. One form of marketing is a coupon, typically in paper form, for a discount toward the product or service. Some coupons may be retailer-specific, for example, only redeemable for the discount at a particular retailer, while other coupons may be product-specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, for example, brand of item, size of the product in terms of packaging, and/or the price point of the given item. A typical coupon may also be redeemable only at a given retailer and/or within a threshold time period.

U.S. Pat. No. 10,121,133 to Nelms et al. discloses a method of self-checkout with a mobile device. More particularly, Nelms et al. discloses scanning items to be placed in a physical shopping cart, the scanned items being placed in a virtual shopping. An identifier, such as, for example, a QR code, upon completion of shopping and checkout (e.g., after payment processing), is displayed on a mobile device associated with the shopper. The cashier scans the identifier to display a listing of items in the virtual shopping cart for comparison to the actual physical shopping cart.

SUMMARY

A food item system may include a remote device associated with a given shopper and a weight sensor associated with a food product display that includes a plurality of food items. The food item system may include a food item processing server configured to add at least one user selected food item from among the plurality thereof to a virtual shopping cart associated with the given shopper based upon proximity of the remote device to the food product display and a change in weight from the weight sensor indicative that the at least one user selected food item has been removed from the food product display by the given shopper. The food item processing server may also be configured to communicate the virtual shopping cart of the given shopper for checkout.

The food item system may also include a proximity sensor adjacent the food product display. The food item processing server may be configured to add the at least one user selected food item to the virtual shopping cart based upon determining the remote device is within a threshold distance from the food product display based upon the proximity sensor, for example.

The food item processing server may be configured to add the at least one user selected food item to the virtual shopping cart based upon determining the remote device is within a threshold distance from the food product display. The food item processing server may be configured to store an electronic shopping list associated with the given shopper and may include the at least one user selected food item, and remove the at least one user selected food item from the electronic shopping list based upon adding the at least one user selected item to the virtual shopping cart, for example.

The food item processing server may be configured to generate a digital promotion for the at least one user selected food item and communicate the digital promotion to the remote device. The food item processing server may be configured to obtain a shopper identifier of the given shopper and communicate the virtual shopping cart based upon the shopper identifier, for example.

The remote device may be configured to communicate the shopper identifier to the food item processing server. The food item system may also include a point-of-sale (POS) terminal, and the food item processing server may be configured to cooperate with the POS terminal to obtain the shopper identifier, for example.

The food item system may further include a point-of-sale (POS) terminal configured to obtain a purchase approval and communicate the purchase approval to the food item processing server, for example. The food item processing server may be configured to store financial data associated with the given shopper and process a purchase transaction for the at least one user selected food item in the virtual shopping cart based upon the purchase approval and the financial data. The remote device may include a mobile wireless communications device, for example.

A method aspect is directed to a method of processing a food item. The method may include using a food item processing server to add at least one user selected food item from among a plurality thereof included within a food product display to a virtual shopping cart associated with a given shopper. The at least one user selected food item may be added based upon proximity of a remote device associated with the given shopper to the food product display and a change in weight from a weight sensor associated with the food product display indicative that the at least one user selected food item has been removed from the food product display by the given shopper. The method may also include using the processor to communicate the virtual shopping cart of the given shopper for checkout.

A computer readable medium aspect is directed to a non-transitory computer readable medium for processing a food item. The non-transitory computer readable medium includes computer executable instructions that when executed by a processor cause the processor to perform operations. The operations may include adding at least one user selected food item from among a plurality thereof included within a food product display to a virtual shopping cart associated with a given shopper. The at least one user selected food item may be added based upon proximity of a remote device associated with the given shopper to the food product display and a change in weight from a weight sensor associated with the food product display indicative that the at least one user selected food item has been removed from the food product display. The operations may include communicating the virtual shopping cart of the given shopper for checkout.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
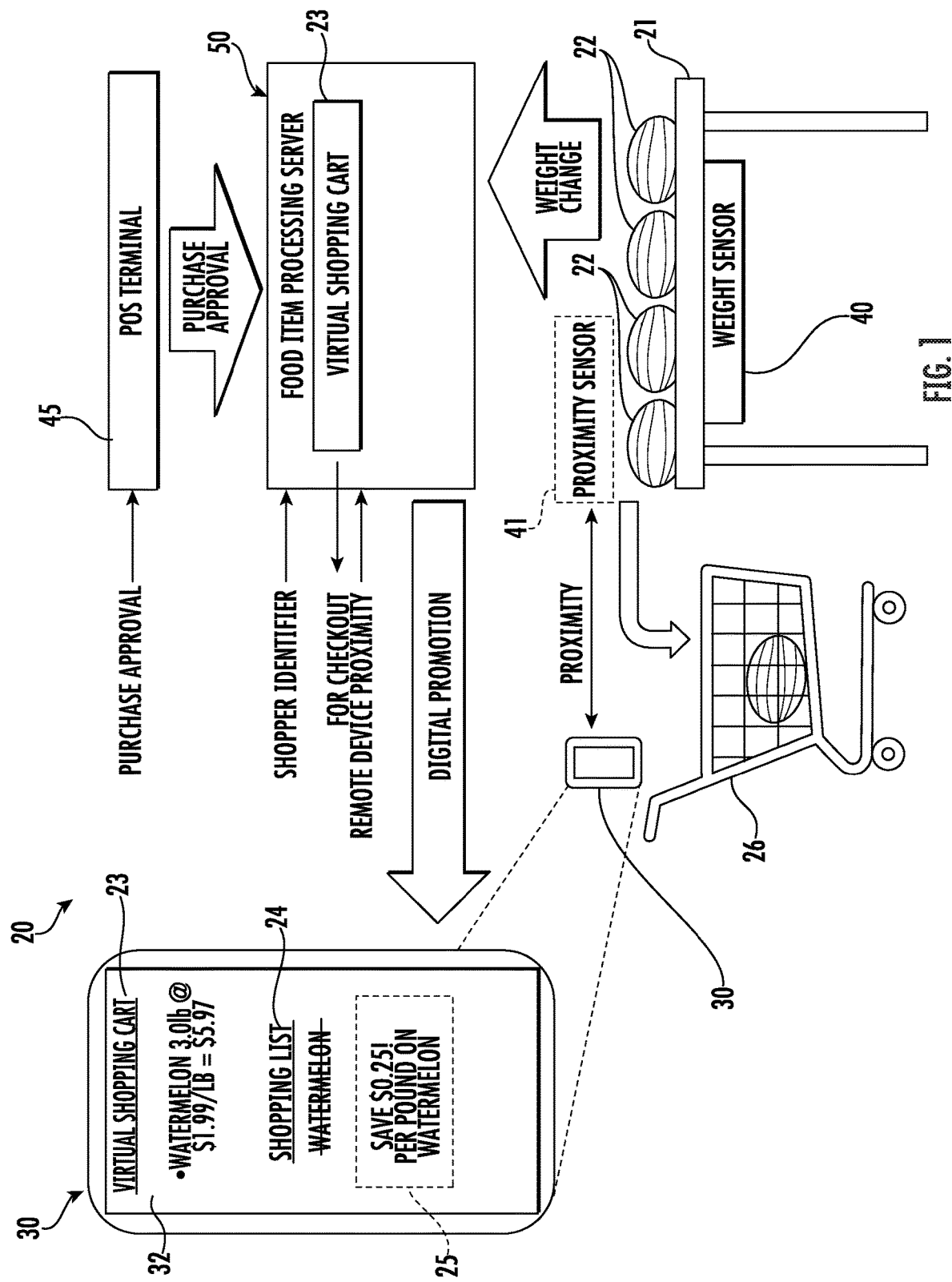
FIG. 1 is a schematic diagram of a food item system in accordance with an embodiment.
Figure 2:
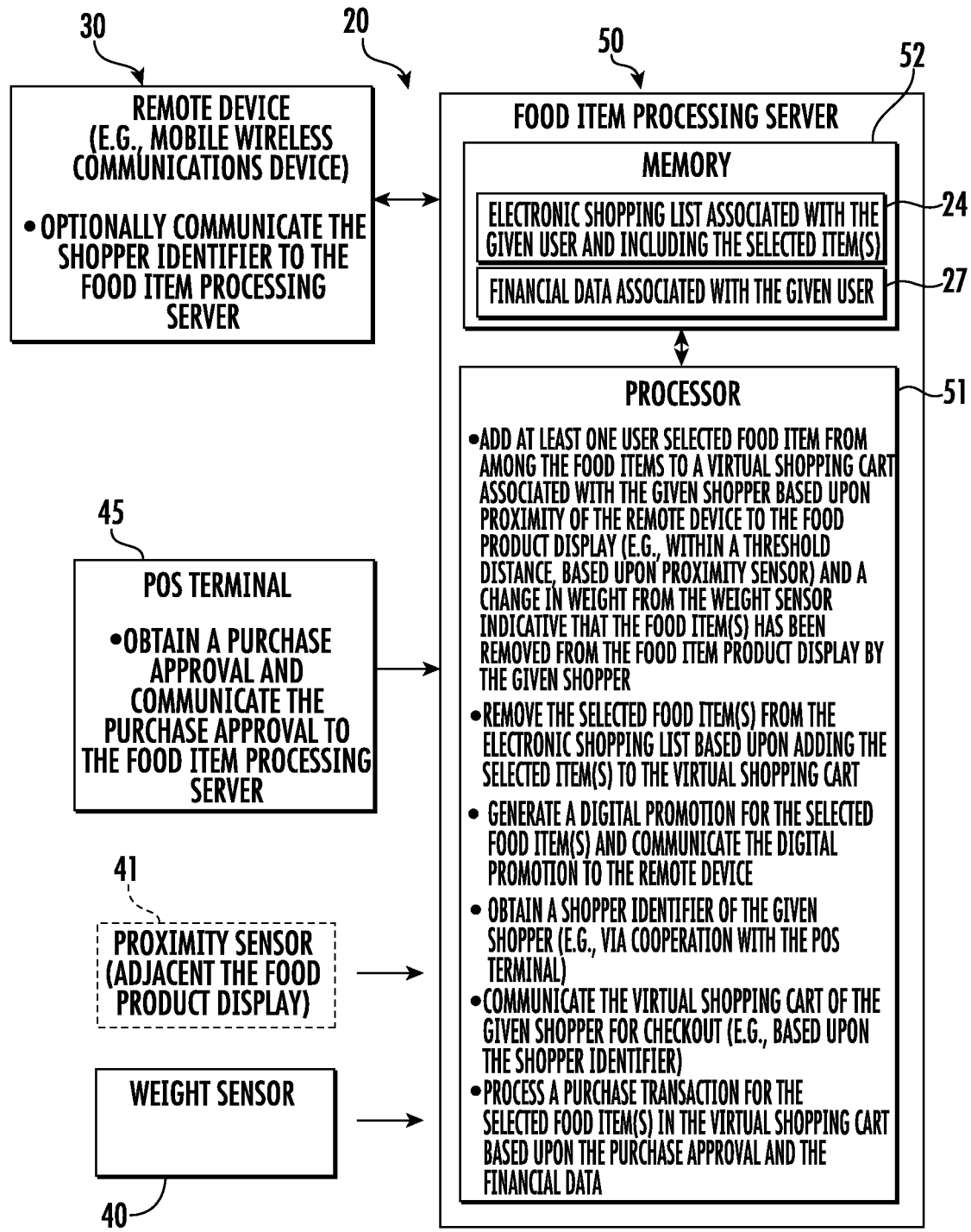
FIG. 2 is a schematic block diagram of the food item system of FIG. 1

Referring initially to FIGS. 1 and 2, a food item system 20 includes a remote device 30 associated with a given shopper. The remote device 30 is illustratively in the form of a mobile wireless communications device, for example, a smartphone. The remote device 30 may be in the form of another type of device, for example, a personal computer, laptop computer, tablet computer or wearable device.

The food item system 20 also includes a weight sensor 40 that is associated with a food product display 21 that includes food items 22. The food product display 21 may be a food product display at a grocery or food store, for example. In one exemplary implementation, the food product display 21 may be a display of fruit items 22, such as watermelons, and that may have a purchase price based upon weight. Of course, the food item display 21 may be a display of boxed food items 22 (e.g., having a package weight) or other items that may be found at a food store. There may be more than one weight sensor 40.

The food item system 20 also includes a food item processing server 50 that includes a processor 51 and an associated memory 52. While operations of the food item processing server 50 are described herein, it should be appreciated that the operations are performed by cooperation between the processor 51 and memory 52.

Figure 3:
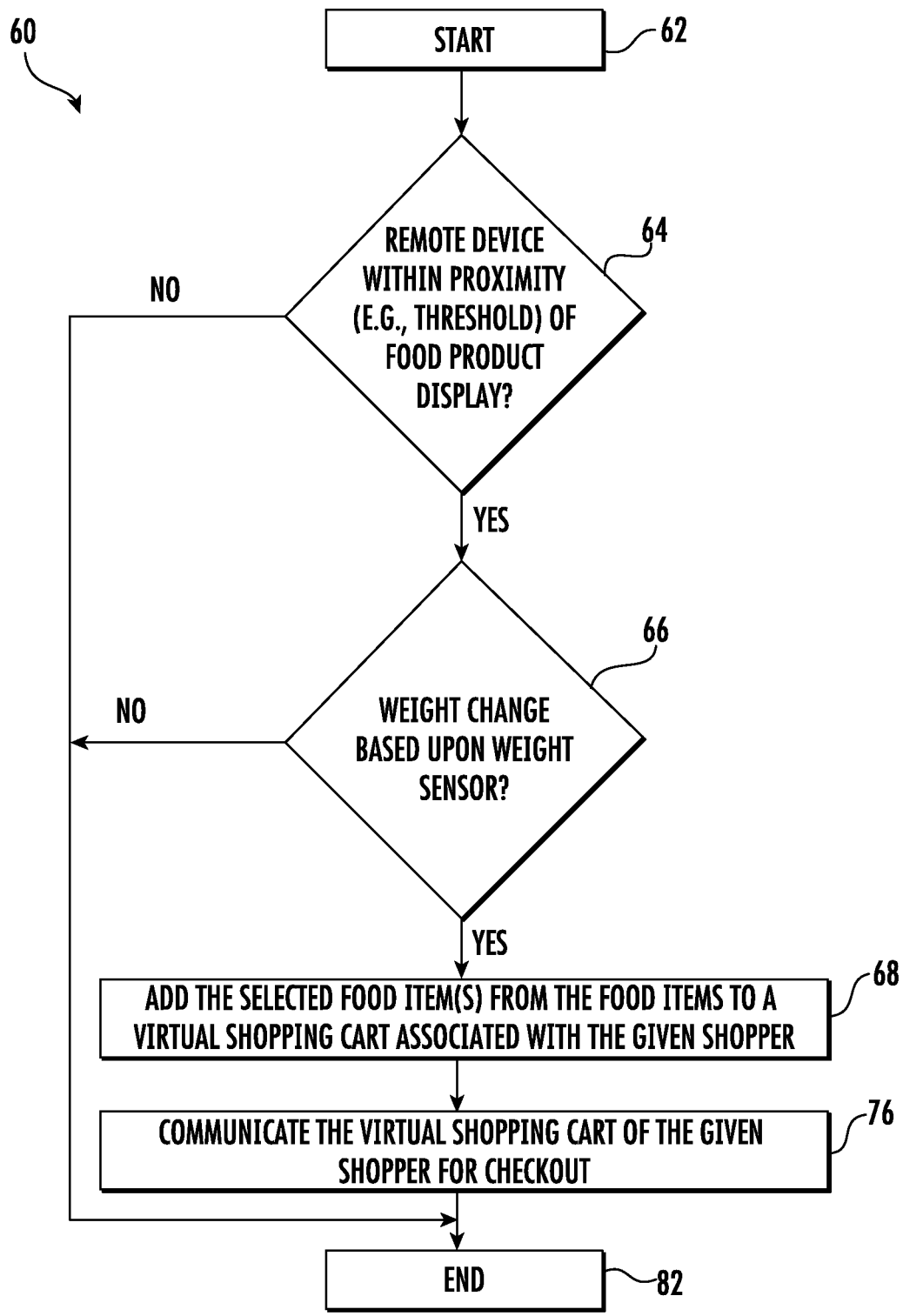
FIG. 3 is a flow diagram of operations of the food item processing server of FIG. 2.

Referring now additionally to the flowchart 60 in FIG. 3, beginning at Block 62, operations of the food item system 20 with respect to the food item processing server 50 will now be described. The food item processing server 50 adds a user selected food item or food items from among the food items 22 to a virtual shopping cart 23 associated with the given shopper. The food item processing server 50 adds the user selected food item based upon a proximity of the remote device 30 to the food product display 21 and based upon a change in weight from the weight sensor 40 that is indicative that the selected food item has been removed from the food product display 21 by the given shopper.

More particularly, at Block 64, the food item processing server determines whether the remote device 30 is proximate to the food product display 21, for example, within a threshold distance from the food product display. In some embodiments, the food product system 20 may include a proximity sensor 41 that is adjacent the food product display 21 and the food item processing server 50 may determine that the remote device 30 is proximate the food item display 21 by way of being within a threshold distance of the proximity sensor. The threshold may be determined based upon the type of food items 22 (e.g., smaller food items may be associated with a smaller threshold distance) and/or traffic around the food product display 21 (e.g., a crowded food product display area may be associated with a smaller threshold to differentiate among remote devices). Of course, other techniques may be used to determine proximity of the remote device 30 to the food product display 21, for example, geolocation, triangulation, and/or cameras or image recognition techniques.

If at Block 64, the remote device 30 is considered to be within the threshold proximity of the food item display 21, the food item processing server 50 determines a change in weight from the weight sensor 40 (Block 66) that is indicative of removing the selected food item from the food product display by the given shopper. More particularly, the food item processing server 50 cooperates with the weight sensor 40 to determine a reduction in weight of the food product display 21 based upon removal of the selected product as may occur when the given shopper adds the selected product to a physical shopping cart 26. Based upon the given shopper's proximity to the food item display 21 via the remote device 30 and a reduction in weight of the food item display, the food item processing server 50 determines that the given shopper has removed the selected food item from the food item display and adds the selected food item to the virtual shopping cart 23 (Block 68). The virtual shopping cart 23 may be displayed on a display 32 of the remote device 30. If at Blocks 66 or 68, the remote device 30 is not proximate to the food item display 21 or there is not a change in weight based upon the weight sensor 40, respectively, operations end at Block 82.

The food item processing server 50 communicates the virtual shopping cart 23 of the given shopper for checkout (Block 76). Operations end at Block 82.

Figure 4A:
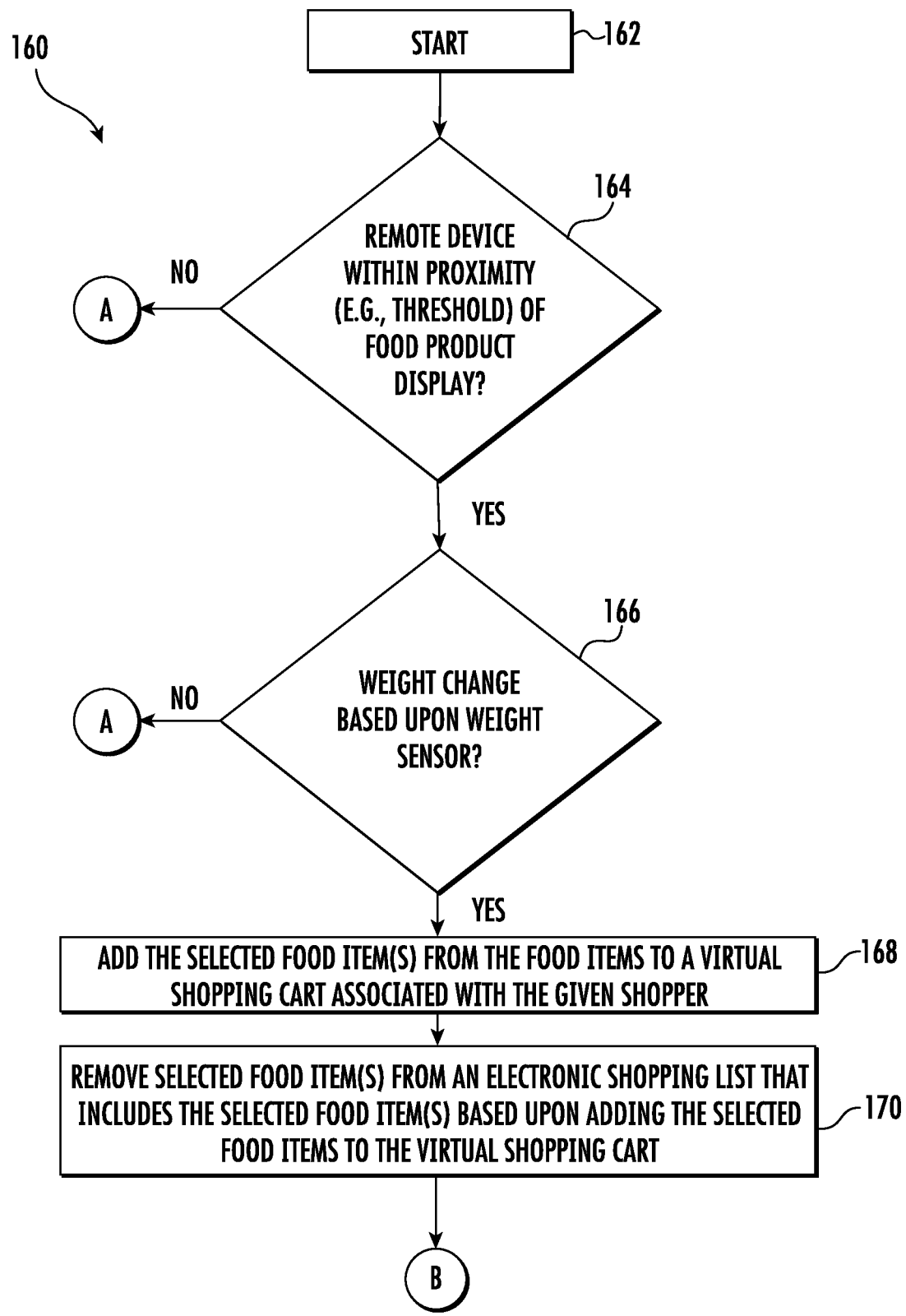
FIG. 4A is a portion of a more detailed flow diagram of operations of the food item processing server of FIG. 2.
Figure 4B:
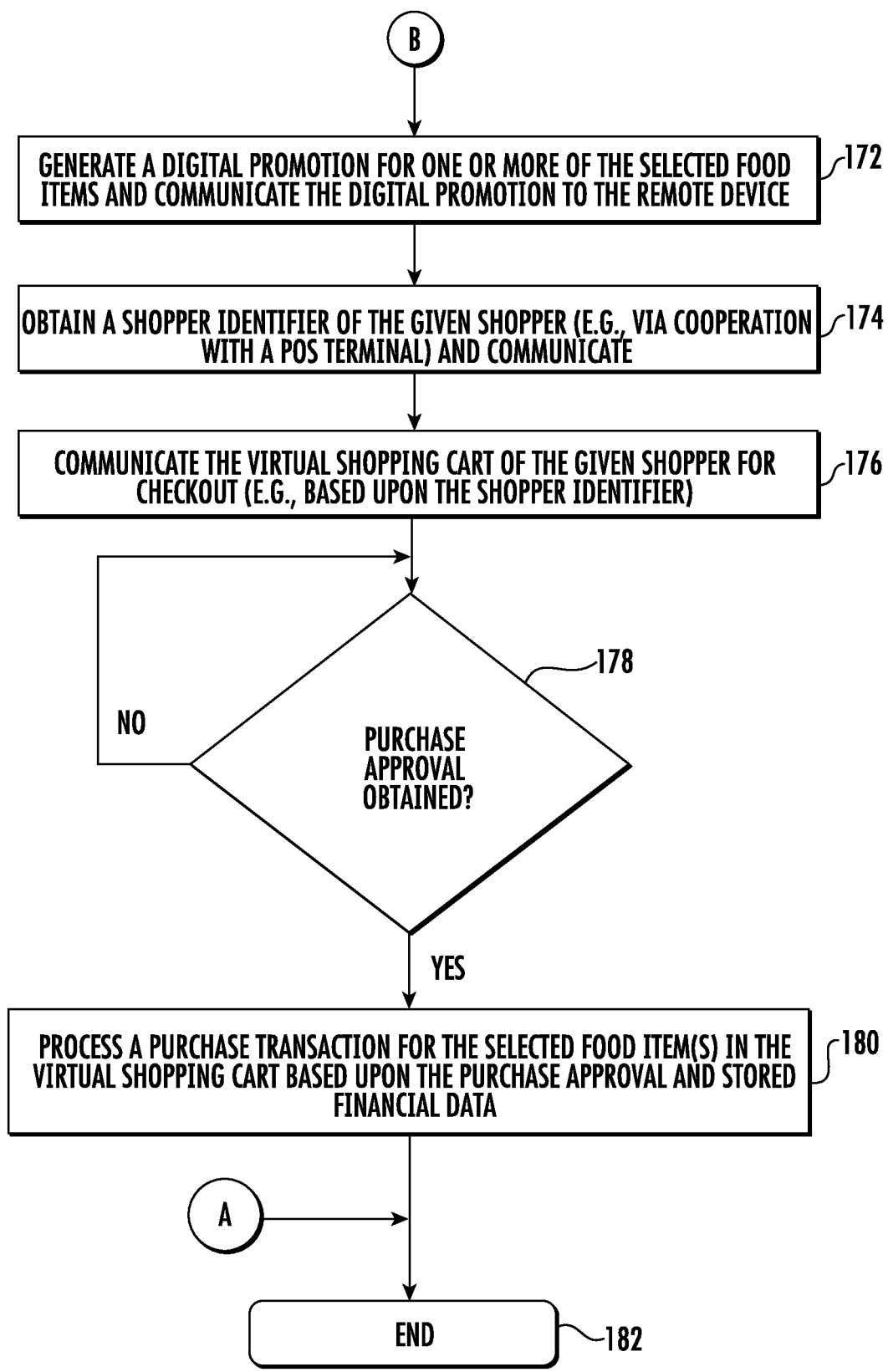
FIG. 4B is another portion of a more detailed flow diagram of operations of the food item processing server of FIG. 2.

Referring now to the flowchart 160 in FIG. 4, beginning at Block 162, more detailed operations of the food item system 20 with respect to the food item processing server 50 will now be described. At Blocks 164, 166, and 168, the food item processing server determines proximity of the remote device 30 and a change in weight based upon the weight sensor 40, and adds the selected food item to the virtual shopping cart 23 as described above.

In some embodiments, the food item processing server 50 may store, for example, in the memory 52, an electronic shopping list 24 associated with the given shopper. The electronic shopping list 24 includes the selected food item or items. At Block 170, the food item processing server 50 may remove the selected food item or items from the electronic shopping list 24 based upon adding the selected food item to the virtual shopping cart 23. In some embodiments, the food item processing server 50 may add the selected item or items to the virtual shopping cart 23 based upon the selected food item or items being on the electronic shopping list 24. In other words, the food item processing server 50 adds the selected items to the virtual shopping cart 23 based upon proximity of the remote device 30, a change in weight from the weight sensor 40, and the selected food item(s) being on the electronic shopping list 24.

The food item processing server 50 may also, in some embodiments, generate a digital promotion 25 for one or more of the selected food items and communicate the digital promotion to the remote device 30 (Block 172). More particularly, the digital promotion 25 may be generated based upon adding the selected food item to the virtual shopping cart 23 and communicating to the remote device 30 for display on the display 32. The digital promotion 25 may be in the form of a digital coupon for a dollar amount off the purchase of the selected product (e.g., $0.25 off per pound of watermelon). The digital promotion 25 or coupon may be redeemed at a point-of-sale (POS) terminal 45 of the food item system 20.

At Block 174, the food item processing server 50 may, in some embodiments, obtain a shopper identifier of the given shopper. The shopper identifier may be in the form of a quick-response (QR) code or a loyalty account number (e.g., a phone number. The shopper identifier may be another type of identifier, for example, an email address.

The shopper identifier may be obtained by the food item processing server 50 by way of the remote device 30. For example, the remote device 30 may communicate the shopper identifier to the food item processing server 50. The remote device 30 may communicate the shopper identifier upon entering the grocery or food store, based upon the addition of selected food items to the virtual shopping cart 23, or manually based upon input to the remote device.

Alternatively, the food item processing server 50 may cooperate with the POS terminal 45 to obtain the shopper identifier. For example, the shopper identifier, when in the form of a numeric identifier, may be input at the POS terminal 45. The remote device 30 may communicate the shopper identifier to the POS terminal 45, e.g., wirelessly, or may display a code (e.g., a QR code) for scanning by or at the POS terminal.

The food item processing server 50 communicates the virtual shopping cart 23 of the given shopper for checkout (Block 176). The virtual shopping cart 23 may be communicated based upon the shopper identifier, for example.

At Block 178, the food item processing server 50 determines whether a purchase approval has been obtained or received from the POS terminal 45. More particularly, the POS terminal 45 may be obtain, for example, via input from a checkout clerk, a purchase approval and communicate the purchase approval to the food item processing server 50. The purchase approval may be indicative of matching (e.g., visually) selected food items in the given shopper's physical shopping cart 26 to the virtual shopping cart 23.

The food item processing server 50 may store financial data 27, for example, in the memory 52. The financial data 27 may be data for completing a purchase transaction, for example, credit or debit card information, banking information, or other information for completing the purchase transaction. The food item processing server 50, at Block 180, processes a purchase transaction for the selected food item or items in the virtual shopping cart 23 based upon the purchase approval (Block 178). In other words, upon obtaining the purchase approval, the food item processing server 50 processes the purchase transaction. The food item processing server 50 may process the purchase transaction through cooperation with the other servers or computers, for example, associated with a financial institution. Operations end at Block 182.

While a specific order of operations has been described, those skilled in the art will appreciate that the food item processing server 50 may determine proximity of the remote device 30 after or concurrently with determining a change in weight from the weight sensor 40. Moreover, while the digital promotion generation and communication, and shopping list item removal are described as occurring in a specific order, they too may be performed in another order or concurrently.

As will be appreciated by those skilled in art, the food item system 20 may advantageously provide a more efficient checkout process. For example, by providing weight sensors 40 at or to be associated with food product displays 21 in a given food store, for example, checkout speeds may be improved by removing the one-by-one scanning of food items that typically occurs in a checkout process. Moreover, more accurate stock data may be obtained as the food processing server 50 may track, prior to checkout, the amount, types, and specific items in virtual shopping carts.

A method aspect is directed to a method of processing a food item 22. The method includes using a food item processing server 50 to add at least one user selected food item 22 from among a plurality thereof included within a food product display 21 to a virtual shopping cart 23 associated with a given shopper. The at least one user selected food item is added based upon proximity of a remote device 30 associated with the given shopper to the food product display 21 and a change in weight from a weight sensor 40 associated with the food product display indicative that the at least one user selected food item has been removed from the food product display by the given shopper. The method also includes using the processor 51 to communicate the virtual shopping cart 23 of the given shopper for checkout.

A computer readable medium aspect is directed to a non-transitory computer readable medium for processing a food item 22. The non-transitory computer readable medium includes computer executable instructions that when executed by a processor 51 cause the processor to perform operations. The operations include adding at least one user selected food item 22 from among a plurality thereof included within a food product display 21 to a virtual shopping cart 23 associated with a given shopper. The at least one user selected food item 22 may be added based upon proximity of a remote device 30 associated with the given shopper to the food product display 21 and a change in weight from a weight sensor 40 associated with the food product display indicative that the at least one user selected food item has been removed from the food product display. The operations may include communicating the virtual shopping cart 23 of the given shopper for checkout.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A food item system comprising:
a remote device associated with a given shopper;
a weight sensor associated with a food product display comprising a plurality of food items; and
a food item processing server configured to
add at least one user selected food item from among the plurality thereof to a virtual shopping cart associated with the given shopper based upon proximity of the remote device to the food product display and a change in weight from the weight sensor indicative that the at least one user selected food item has been removed from the food product display by the given shopper,
generate a digital promotion for the at least one user selected food item and communicate the digital promotion to the remote device, and
communicate the virtual shopping cart of the given shopper for checkout.

2. The food item system of claim 1 further comprising a proximity sensor adjacent the food product display; and wherein the food item processing server is configured to add the at least one user selected food item to the virtual shopping cart based upon determining the remote device is within a threshold distance from the food product display based upon the proximity sensor.

3. The food item system of claim 1 wherein the food item processing server is configured to add the at least one user selected food item to the virtual shopping cart based upon determining the remote device is within a threshold distance from the food product display.

4. The food item system of claim 1 wherein the food item processing server is configured to:
store an electronic shopping list associated with the given shopper and comprising the at least one user selected food item; and
remove the at least one user selected food item from the electronic shopping list based upon adding the at least one user selected item to the virtual shopping cart.

5. The food item system of claim 1 wherein the food item processing server is configured to obtain a shopper identifier of the given shopper and communicate the virtual shopping cart based upon the shopper identifier.

6. The food item system of claim 5 wherein the remote device is configured to communicate the shopper identifier to the food item processing server.

7. The food item system of claim 5 further comprising a point-of-sale (POS) terminal; and wherein the food item processing server is configured to cooperate with the POS terminal to obtain the shopper identifier.

8. The food item system of claim 1 further comprising a point-of-sale (POS) terminal configured to obtain a purchase approval and communicate the purchase approval to the food item processing server.

9. The food item system of claim 8 wherein the food item processing server is configured to store financial data associated with the given shopper and process a purchase transaction for the at least one user selected food item in the virtual shopping cart based upon the purchase approval and the financial data.

10. The food item system of claim 1 wherein the remote device comprises a mobile wireless communications device.

11. A food item processing server comprising:
a processor and an associated memory configured to
add at least one user selected food item from among a plurality thereof included within a food product display to a virtual shopping cart associated with a given shopper, the at least one user selected food item being added to the virtual shopping cart based upon proximity of a remote device associated with the given shopper to the food product display and a change in weight from a weight sensor associated with the food product display indicative that the at least one user selected food item has been removed from the food product display by the given shopper,
generate a digital promotion for the at least one user selected food item and communicate the digital promotion to the remote device, and
communicate the virtual shopping cart of the given shopper for checkout.

12. The food item processing server of claim 11 wherein the processor is configured to add the at least one user selected food item to the virtual shopping cart based upon determining the remote device is within a threshold distance from the food product display based upon a proximity sensor adjacent the food product display.

13. The food item processing server of claim 11 wherein the processor is configured to add the at least one user selected food item to the virtual shopping cart based upon determining the remote device is within a threshold distance from the food product display.

14. The food item processing server of claim 11 wherein the processor is configured to:
store an electronic shopping list associated with the given shopper and comprising the at least one user selected food item; and
remove the at least one user selected food item from the electronic shopping list based upon adding the at least one user selected item to the virtual shopping cart.

15. The food item processing server of claim 11 wherein the processor is configured to obtain a shopper identifier of the given shopper and communicate the virtual shopping cart based upon the shopper identifier.

16. A method of processing a food item comprising:
using a food item processing server to
add at least one user selected food item from among a plurality thereof included within a food product display to a virtual shopping cart associated with a given shopper, the at least one user selected food item being added based upon proximity of a remote device associated with the given shopper to the food product display and a change in weight from a weight sensor associated with the food product display indicative that the at least one user selected food item has been removed from the food product display by the given shopper,
generate a digital promotion for the at least one user selected food item and communicate the digital promotion to the remote device, and
communicate the virtual shopping cart of the given shopper for checkout.

17. The method of claim 16 wherein using the food item processing server comprises using the food item processing server to add the at least one user selected food item to the virtual shopping cart based upon determining the remote device is within a threshold distance from the food product display based upon a proximity sensor adjacent the food product display.

18. The method of claim 16 wherein using the food item processing server comprises using the food item processing server to add the at least one user selected food item to the virtual shopping cart based upon determining the remote device is within a threshold distance from the food product display.

19. The method of claim 16 wherein using the food item processing server comprises using the food item processing server to:
- store an electronic shopping list associated with the given shopper and comprising the at least one user selected food item; and
- remove the at least one user selected food item from the electronic shopping list based upon adding the at least one user selected item to the virtual shopping cart.

20. A non-transitory computer readable medium for processing a food item, the non-transitory computer readable medium comprising computer executable instructions that when executed by a processor cause the processor to perform operations comprising:
- adding at least one user selected food item from among a plurality thereof included within a food product display to a virtual shopping cart associated with a given shopper, the at least one user selected food item being added based upon proximity of a remote device associated with the given shopper to the food product display and a change in weight from a weight sensor associated with the food product display indicative that the at least one user selected food item has been removed from the food product display,
- generating a digital promotion for the at least one user selected food item and communicating the digital promotion to the remote device, and
- communicating the virtual shopping cart of the given shopper for checkout.

21. The non-transitory computer readable medium of claim 20 wherein the operations comprise adding the at least one user selected food item to the virtual shopping cart based upon determining the remote device is within a threshold distance from the food product display based upon a proximity sensor adjacent the food product display.

22. The non-transitory computer readable medium of claim 20 wherein the operations comprise adding the at least one user selected food item to the virtual shopping cart based upon determining the remote device is within a threshold distance from the food product display.

23. The non-transitory computer readable medium of claim 20 wherein the operations comprise:
- storing an electronic shopping list associated with the given shopper and comprising the at least one user selected food item; and
- removing the at least one user selected food item from the electronic shopping list based upon adding the at least one user selected item to the virtual shopping cart.

* * * * *